US008171425B2

(12) United States Patent
Song et al.

(10) Patent No.: US 8,171,425 B2
(45) Date of Patent: May 1, 2012

(54) USER INTERFACE METHOD OF MULTI-TASKING AND COMPUTER READABLE RECORDING MEDIUM STORING PROGRAM FOR EXECUTING THE METHOD

(75) Inventors: Sang-gon Song, Yeongcheon-si (KR); Hyun-cheol Park, Suwon-si (KR); Hyun-kook Jang, Suwon-si (KR); Sung-han Lee, Hwaseong-si (KR); Heui-jin Kwon, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 944 days.

(21) Appl. No.: 11/645,744

(22) Filed: Dec. 27, 2006

(65) Prior Publication Data

US 2007/0220440 A1    Sep. 20, 2007

(30) Foreign Application Priority Data

Mar. 15, 2006  (KR) ......................... 10-2006-0023933

(51) Int. Cl.
*G06F 3/048* (2006.01)
(52) U.S. Cl. ..................... 715/810; 715/811; 715/961
(58) Field of Classification Search .................. 715/810, 715/811, 961
See application file for complete search history.

(56) References Cited

U.S. PATENT DOCUMENTS

2003/0119562 A1    6/2003    Kokubo

FOREIGN PATENT DOCUMENTS

| CN | 1811686 A | 8/2006 |
| KR | 10-2004-0051335 A | 6/2004 |

OTHER PUBLICATIONS

Maria Langer, "Mac OS X: Visual QuickStart Guide," Apr. 18, 2001, Peachpit Press.*
TLA Systems, "DragThing 5.0.2," http://macguild.org/reviews/review187.html, Mar. 2004.*
Dan Frakes, "Keyboard Control," http://homepage.mac.com/frakes/MOSXPT/content/keyboard.html, Nov. 2004.*
John Siracusa, "Mac OS X 10.3 Panther," http://www.dummies.com/how-to/content/enabling-mac-os-x-panther-expose.html, Nov. 2003.*
Lisa A. Bucki, "Mac OS X Version 10.2 Jaguar fast&easy," 2003.*

* cited by examiner

*Primary Examiner* — William Bashore
*Assistant Examiner* — Daniel Um
(74) *Attorney, Agent, or Firm* — Sughrue Mion, PLLC

(57) ABSTRACT

Provided are a user interface method of enabling a user to conveniently use a terminal allowing multi-tasking, and a computer readable recording medium storing the method. The user interface method includes classifying applications capable of being executed by the apparatus into groups, in such a manner as to classify one or more applications that perform similar functions into the same group; and displaying a window for executing a corresponding application, for each of the groups.

32 Claims, 8 Drawing Sheets

140
USER INTERFACE METHOD OF MULTI-TASKING AND COMPUTER READABLE RECORDING MEDIUM STORING PROGRAM FOR EXECUTING THE METHOD

CROSS-REFERENCE TO RELATED PATENT APPLICATION

This application claims priority from Korean Patent Application No. 10-2006-0023933, filed on Mar. 15, 2006, in the Korean Intellectual Property Office, the disclosure of which is incorporated herein by reference in its entirety.

BACKGROUND OF THE INVENTION

1. Field of the Invention

The present invention relates to a user interface, and more particularly, to a user interface method of enabling a user to conveniently use a terminal allowing multi-tasking, and a computer readable recording medium storing the method.

2. Description of the Related Art

Due to recent developments in the specification and performance of consumer electronics (CE) products such as mobile terminals, CE products allowing multi-tasking have been developed. However, no user interface to which multi-tasking can be applied is yet provided. That is, users would select an application to be executed as a background, using a menu configured with a conventional hierarchical structure, which is inconvenient. Accordingly, a technology for eliminating such inconvenience is needed.

SUMMARY OF THE INVENTION

The present invention provides a user interface method for enabling a user to conveniently and efficiently use a multi-tasking function of a device, and a computer readable recording medium storing a program for executing the method.

According to an aspect of the present invention, there is provided a user interface method performed by an apparatus allowing multi-tasking, including: classifying a plurality of applications capable of being executed by the apparatus into a plurality of groups, in such a manner as to classify one or more applications that perform similar functions into the same group; and displaying a window for executing a corresponding application, for each of the plurality of groups.

The displaying of a window may further include, displaying an application selection menu for selecting one of the plurality of applications belonging to a corresponding group, in each window.

The displaying of a window may further include, displaying a plurality of windows by using a multi-layer structure in such a manner that application execution areas of the plurality of windows overlap each other, and displaying the plurality of windows in such a manner that an application selection menu of each window is always shown.

The user interface method may further include, displaying a thumbnail corresponding to an application being executed as a background, when a plurality of applications are executed in a multi-tasking manner.

The displaying of a window may further include, displaying an additional function selection menu for selecting one of a plurality of additional functions of each application being executed, in a corresponding window.

The displaying of the application selection menu and the displaying of the additional function selection menu may include, locating the application selection menu and the additional function selection menu in respective edges of a screen, in such a manner that the application selection menu and the additional function selection menu do not overlap each other.

The user interface method may further include, moving a focus to one of the items within an application selection menu or within an additional function selection menu located at a predetermined edge according to a pressed direction key, when the direction key included in the apparatus is pressed.

The user interface method may further include, moving a focus to one of the items of an additional function selection menu corresponding to a currently executed application, when the currently executed application is displayed as a foreground and additional functions of the currently executed application are provided.

The user interface method may further include, moving a focus to one of the items of an application selection menu displayed in a different window, when a currently executed application is displayed as a foreground.

The classifying of the plurality of applications may include classifying the plurality of applications capable of being executed by the apparatus into a visual application group and an aural application group.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, exemplary embodiments of the present invention will be described in detail with reference to the appended drawings.

In an aspect of the present invention, in order to support multi-tasking, windows with a multi-layer structure are defined and used.

A user interface according to an aspect of the present invention overlaps and displays windows by the number of applications which can be executed by a multi-tasking method, appropriately configures selectable menus in the respective windows, and manipulates four-directional keys, thereby easily performing menu selection.

Figure 1:
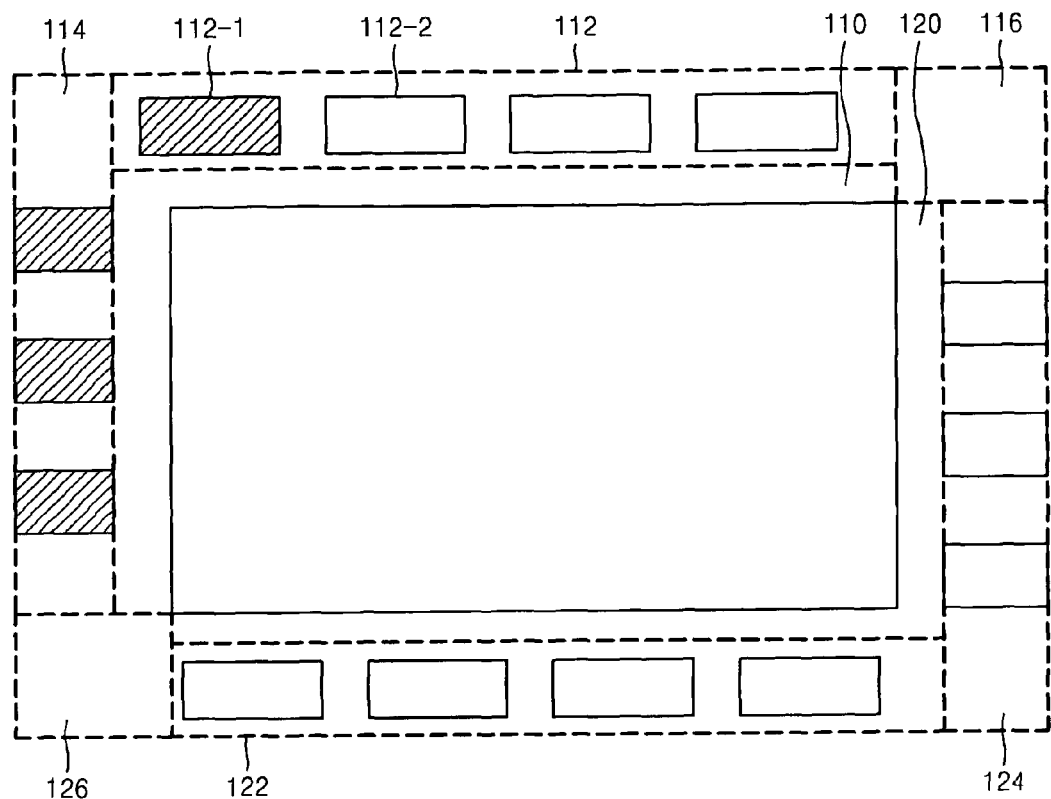
FIG. 1 illustrates an example of a user interface screen to which an exemplary embodiment of the present invention is applied.

FIG. 1 illustrates an example of a user interface screen to which an exemplary embodiment of the present invention is applied.

Referring to FIG. 1, two applications can be respectively executed on a first layer window and a second layer window. The first layer window includes an application selection menu 112 which allows a user to select applications which cannot be simultaneously executed since the applications perform similar functions, an additional function selection menu 114 which allows a user to select additional functions of a selected application, and an application execution area 110 on which the selected application is executed. Likewise, the second layer window includes an application selection menu 122 which allows a user to select applications that are not included in the first layer window, that can be simultaneously executed with the applications on the first layer window, and that cannot be simultaneously executed with each other, an additional function selection menu 124 which allows a user to select additional functions of a selected application, and an application execution area 120 on which the selected application is executed. The application execution areas 110 and 120 of the two layer windows are displayed in a manner so as to overlap each other, in order that the corresponding area of an application being executed as a background is hidden and not shown by the corresponding part of an application being executed as a foreground.

However, the menu parts of the first and second layer windows are displayed so that they are always shown. Selection buttons that can be currently selected may have a color different from selection buttons that cannot be currently selected. Referring to FIG. 1, the application selection menus 112 and 122 and the additional function selection menus 114 and 124 of the first and second layer windows are displayed in a manner so as to not overlap each other, and are always shown on the screen. In FIG. 1, a first item 112-1 of the application selection menu 112 of the first layer window and an additional function selection menu 114 corresponding to the first item 112-1, which are selection buttons that can be currently selected, are denoted by oblique lines, in order to distinguish them from selection buttons that cannot be currently selected. Accordingly, when a user wants to change a current layer to a different layer for program conversion, he or she has only to select a desired menu item.

Also, when an application is executed as a background, a thumbnail corresponding to the application is displayed. Referring to FIG. 1, if an application of the first layer window is executed as a background, a thumbnail corresponding to the application of the first layer window is displayed in a first thumbnail area 116, and, if an application of the second layer window is executed as a background, a thumbnail corresponding to the application of the second layer window is displayed in a second thumbnail area 126.

Figure 2:
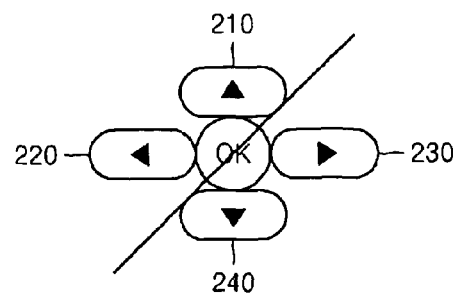
FIG. 2 is a view illustrating an input device for manipulating the user interface screen.

FIG. 2 is a view illustrating an input device for manipulating the user interface screen.

By using the user interface according to the present invention, it is possible to conveniently perform multi-tasking in an apparatus that includes a four-directional key input device. Referring to FIG. 2, an up direction key 210 and a left direction key 220 of the four-directional keys respectively correspond to the application selection menu 112 and the additional function selection menu 114 of the first layer window. Also, a down direction key 240 and a right direction key 230 of the four-directional keys respectively correspond to the application selection menu 122 and the additional function selection menu 124 of the second layer window.

If a user presses a direction key, a focus or cursor is moved between menu items located at the edge of the corresponding direction on the screen. For example, if the user presses the up direction key 210, the focus will be moved from the menu item 112-1 to the next one 112-2. And then, if the user pressed the OK button of the input device, an application corresponding to the next menu item 112-2 will be selected and executed. Thus, the user can instinctively and conveniently use the interface without having to learn how to use the interface. Furthermore, if the colors of the respective direction keys are different from each other and the colors of the menu items match those of the corresponding direction keys, the user can more conveniently use the interface. For example, if the color of the left direction key of the input device matches the color of the additional function selection menu located at the left edge of the first layer window, the user can instinctively learn how to use the interface.

Figure 3:
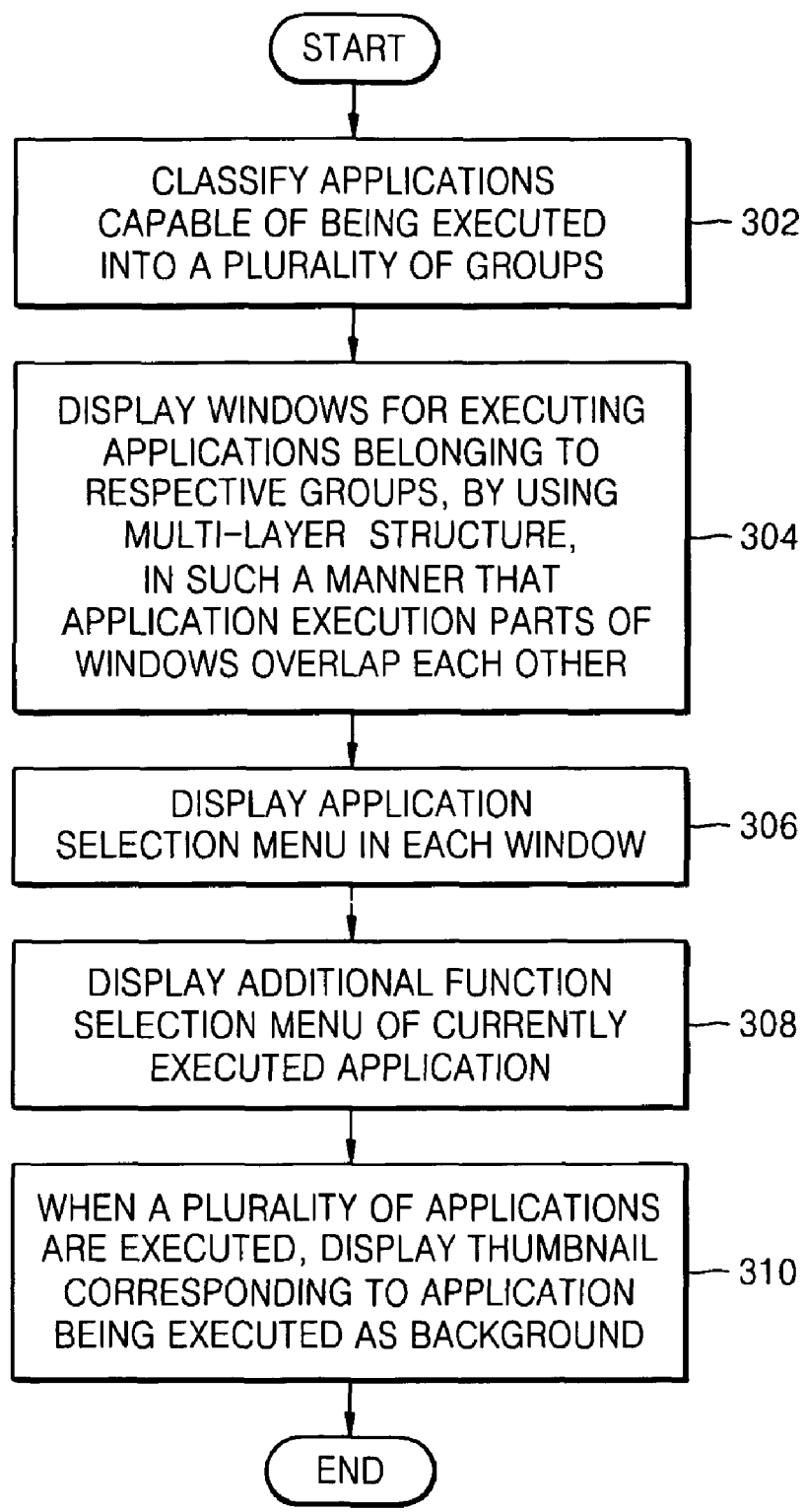
FIG. 3 is a flowchart illustrating a user interface method according to an exemplary embodiment of the present invention.

FIG. 3 is a flowchart illustrating a user interface method according to an exemplary embodiment of the present invention.

Referring to FIG. 3, the user interface method performed by an apparatus allowing multi-tasking, first classifies applications that can be executed into a plurality of groups (operation 302). Here, one or more applications that do not allow multi-tasking due to the fact that they perform similar functions are classified into the same group. For example, applications are classified into a visual application group and an aural application group. Since a picture reproducer and a moving picture reproducer are similar to each other in that they are visual applications, it is difficult to simultaneously execute them in an apparatus with a small screen. Accordingly, they are classified into the same group and belong to the same layer window. Also, since a music reproducer which is an aural application can be executed as a background when a picture reproducer which is a visual application is executed, the music reproducer is classified into a group different from a group into which the picture reproducer is classified, and belongs to a separate layer window. Accordingly, it is possible to easily avoid conflict between visual applications and aural applications.

For the classified respective groups, windows for executing the corresponding applications are displayed. At this time, the windows are displayed having a multi-layer structure, in such a manner that application execution areas of the respective windows overlap each other and only an application execution area of a currently selected application is shown (operation 304). Then, application selection menus of the respective windows are displayed (operation 306). Then, an additional function selection menu for selecting one of additional functions of each of the respective applications that are being executed is displayed on the corresponding window (operation 308). The application selection menus and the additional function selection menus may be respectively located at the four edges of the screen, without overlapping each other so that they are always shown on the screen. If a user presses a direction key included in the apparatus, different menu items can be selected within an application selection menu or within an additional function selection menu located at a predetermined edge according to the pressed direction key. When a currently executed application is displayed as a foreground, the user can easily select an application to be executed as a background by moving a focus or a cursor to one of the menu items of an application selection menu displayed in a different window. Also, when a currently executed application is displayed as a foreground and additional functions are provided, by moving a cursor to one of the menu items of the corresponding additional function selection menu, the user can easily select an additional function.

Then, when a plurality of applications are executed in a multi-tasking manner, a thumbnail corresponding to an application being executed as a background is displayed (operation 310). Accordingly, the user can easily recognize which application is executed as the background even though the corresponding application execution area is not shown.

FIGS. 4 through 10 illustrate examples in which the user interface method according to embodiments of the present invention is actually implemented. In these examples, applications are classified into two groups and a screen is composed of two layers. In the drawings, menu items denoted by oblique lines are selection buttons that can be currently selected.

Figure 4:
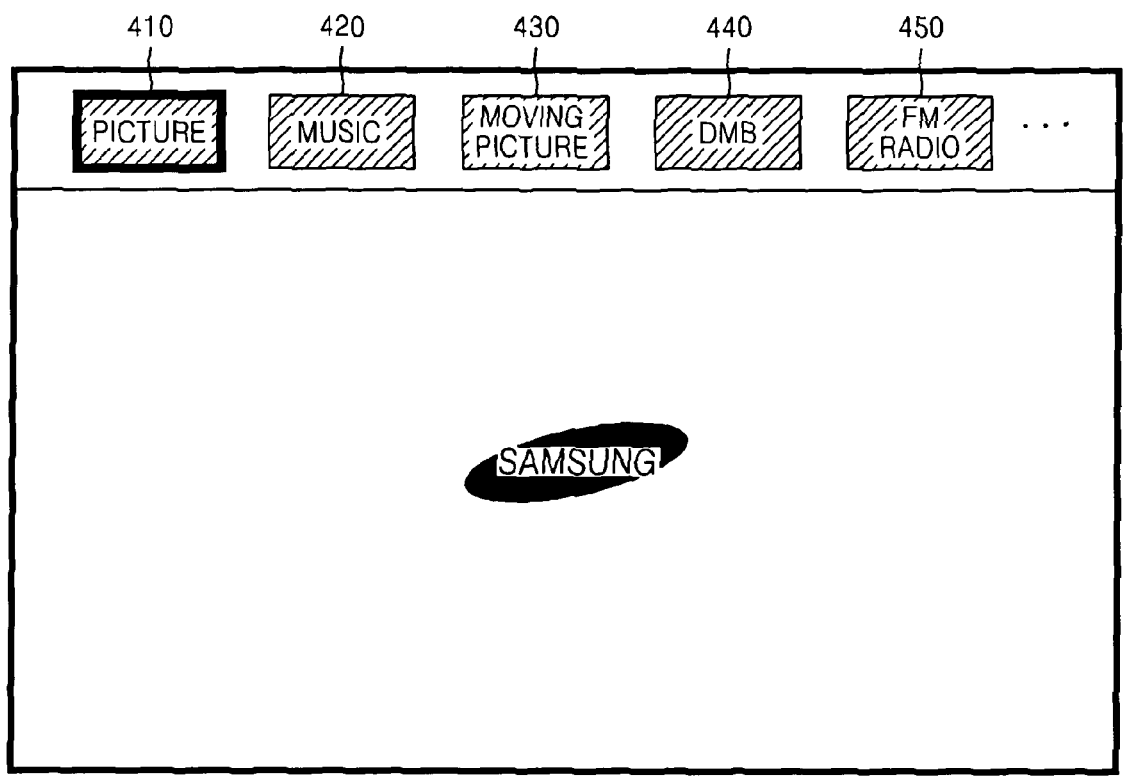
FIG. 4 illustrates an example of a main screen to which the user interface method is applied.

FIG. 4 is an example of a main screen to which the user interface method is applied.

Referring to FIG. 4, picture 410, music 420, moving picture 430, Digital Multimedia Broadcast (DMB) 440, FM radio 450, etc. are applications capable of being selected on the main screen are listed. In this main screen (also, an initial screen), visual applications and aural applications are all listed in one list.

Figure 5:
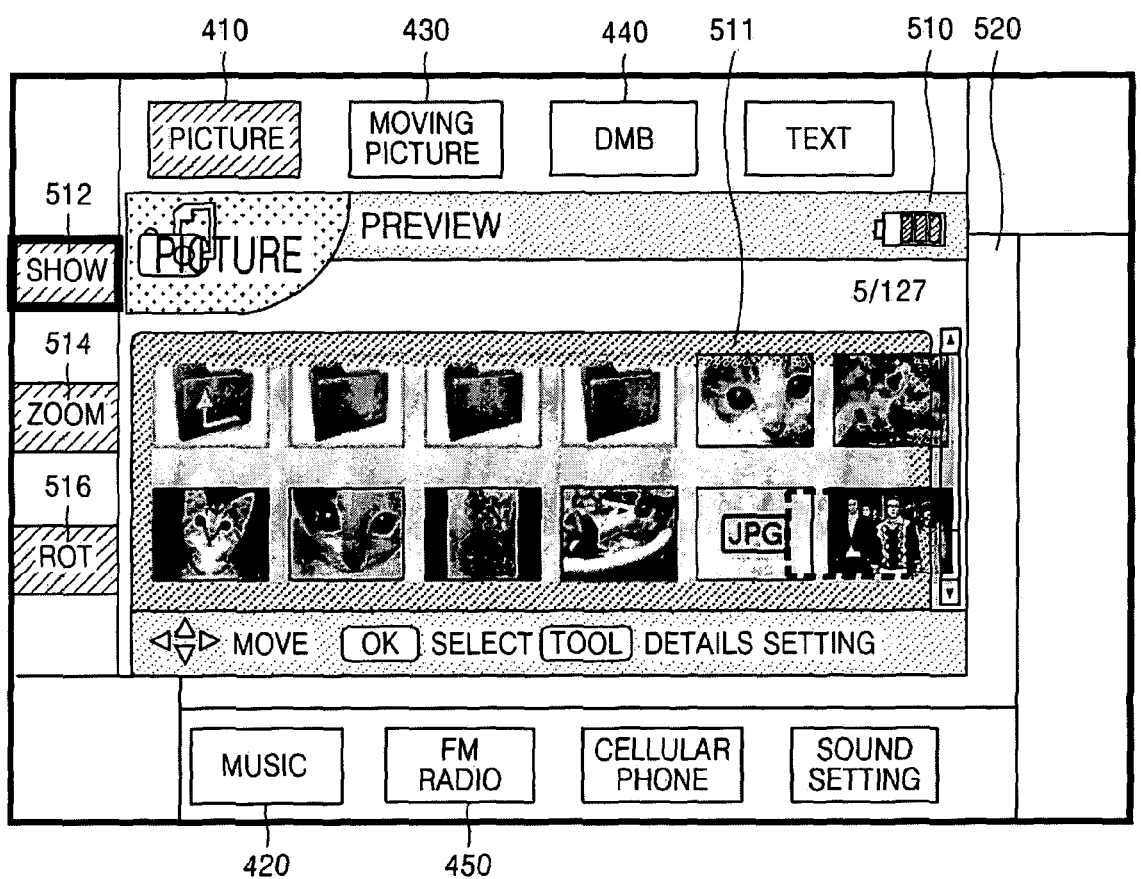
FIG. 5 illustrates a screen appearing when a picture application is selected from the main screen illustrated in FIG. 4.

FIG. 5 illustrates a screen appearing when a "picture" application menu item 410 is selected from the main screen illustrated in FIG. 4.

Referring to FIG. 5, since a user selects the picture 410, a first layer window 510 including visual applications, such as the picture 410, the moving picture 430, the DMB 440, etc., and a second layer window 520 including aural applications, such as the music 420, the FM radio 450, etc., are displayed. Menus of the respective windows are respectively displayed at four edges of the screen in such a manner that they are always shown on the screen, however, application execution areas on which two applications are respectively executed are displayed in such a manner that they overlap each other. When the picture 410 which is a currently selected application is executed, a picture list screen is displayed on an application execution area 511, and an additional function selection menu, such as SHOW 512, ZOOM 514, ROT 516, etc., including additional functions capable of being performed with respect to the picture 410, is dynamically configured and displayed. If the user selects the moving picture 430, a different additional function selection menu will be displayed.

Figure 6:
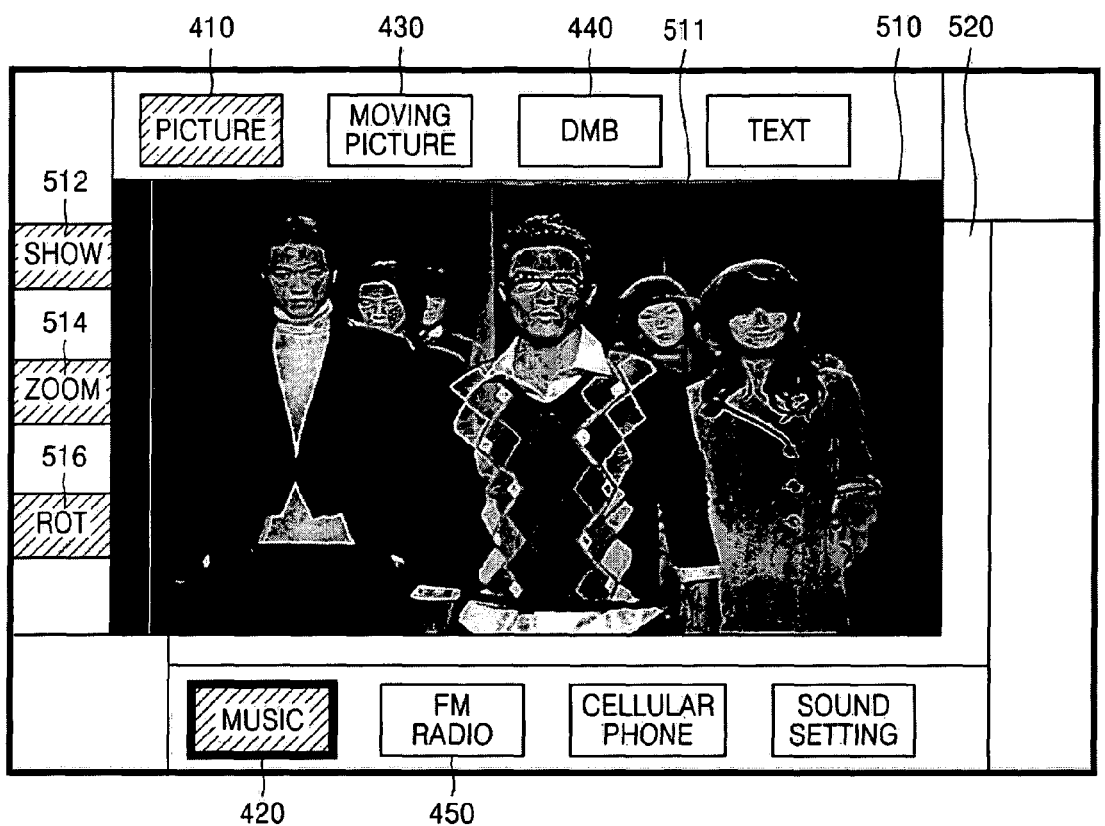
FIG. 6 illustrates a screen appearing when an additional function is selected from the screen illustrated in FIG. 5.

FIG. 6 illustrates a screen appearing when an additional function is selected from the screen illustrated in FIG. 5, and in this case, a desired picture is selected from the picture list area 511, and the SHOW 512 which is an additional function corresponding to "slide show view" is selected.

Referring to FIG. 6, a screen through which a user can view a slide show corresponding to the selected picture, is displayed on the application execution area 511. Also, in order to allow the user to select a different application while enjoying the selected content, menu buttons of the second layer window are visually differentiated so that the user can determine whether the menu buttons are in a selectable state. In this embodiment, a cursor is moved to the "music" application 420 corresponding to a first menu button.

Figure 7:
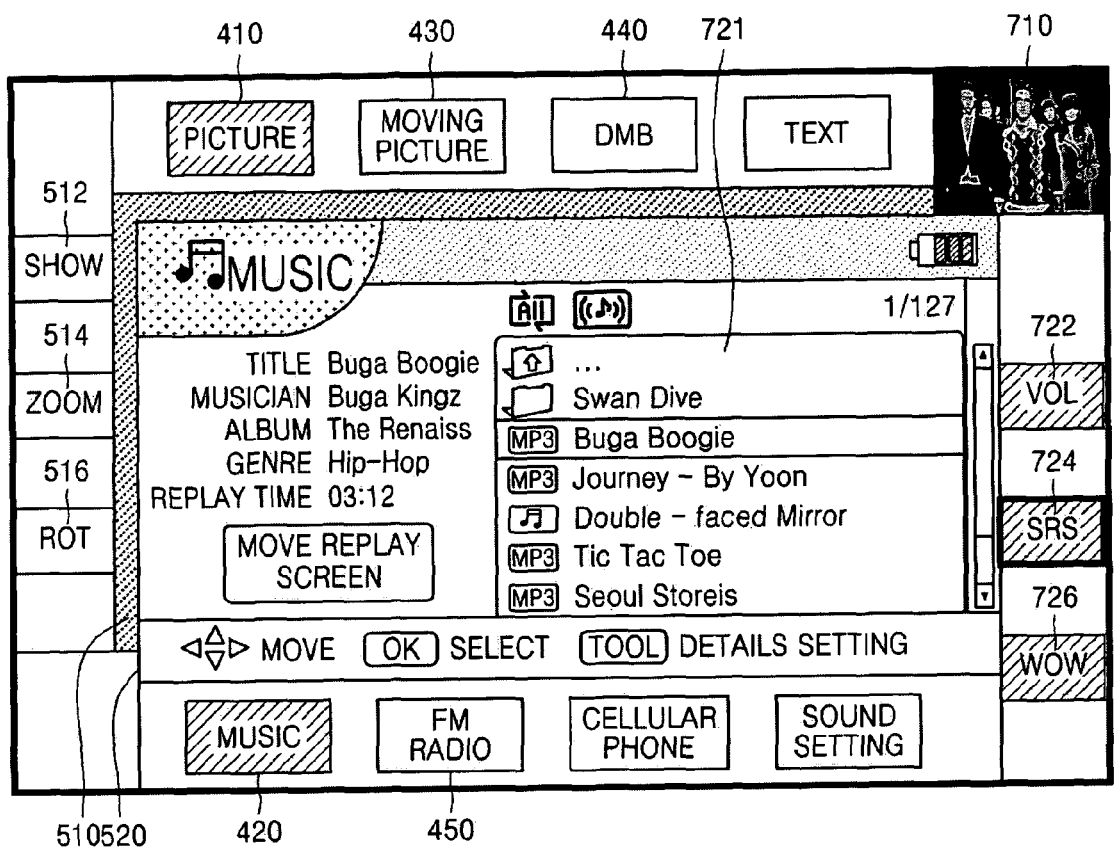
FIG. 7 illustrates a screen appearing when a music application is selected from the screen illustrated in FIG. 6.

FIG. 7 illustrates a screen appearing when the user selects the "music" application 420 from the screen illustrated in FIG. 6 in order to listen to background music while appreciating the selected picture.

Referring to FIG. 7, the second layer window is activated and displayed as a foreground of the screen, and the corresponding music application 420 is executed in an application execution area 721. Also, VOL 722, SRS 724, and WOW 726, which are menu items of additional functions that can be used in the music application 420, are listed. Meanwhile, a thumbnail 710 for the picture application being executed as a background is displayed at the upper right part of the screen.

Figure 8:
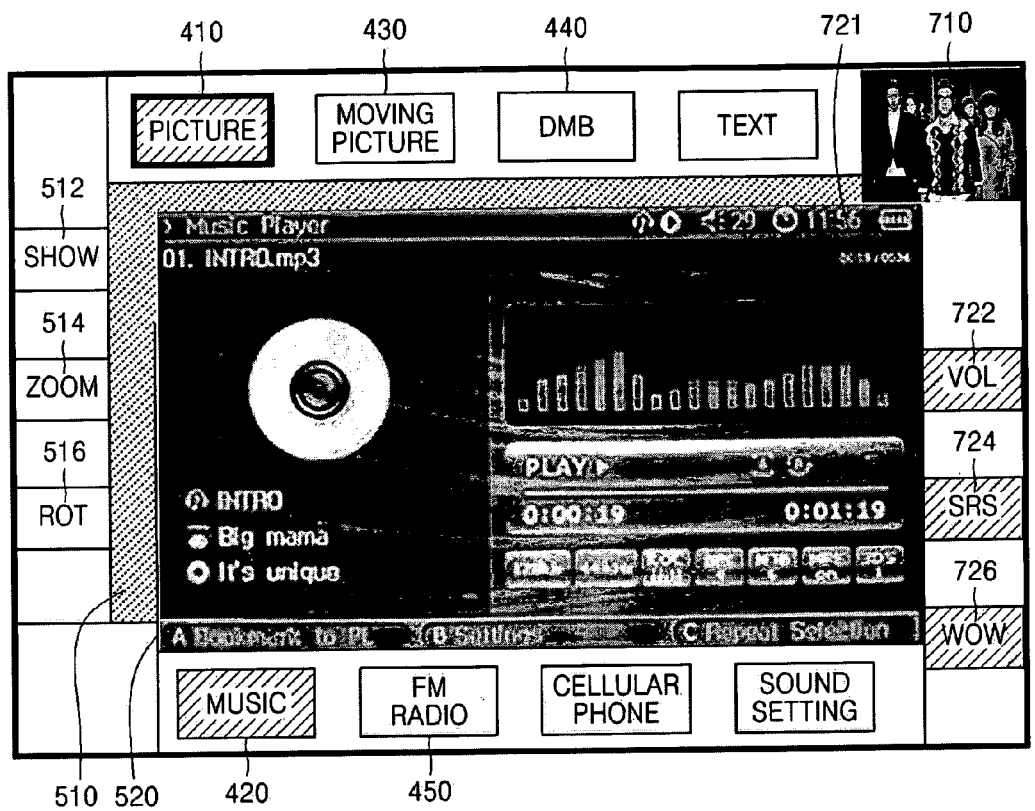
FIG. 8 illustrates a screen appearing when an additional function is selected from the screen illustrated in FIG. 7.

FIG. 8 illustrates a screen appearing when an additional function is selected from the screen illustrated in FIG. 7, and in this case, desired music is selected from a music list and the SRS 724 is selected as an additional function.

Referring to FIG. 8, since appreciating a picture while music content is being reproduced is more preferable, a focus is moved to the picture menu 410 after a predetermined time elapses. That is, since users tend to execute a visual application as a foreground when the visual application and an aural application are simultaneously executed, the focus is moved to a menu corresponding to the visual application for the convenience of the user.

Figure 9:
FIG. 9 illustrates a screen appearing when conversion into a picture application window occurs on the screen illustrated in FIG. 8.

FIG. 9 illustrates a screen appearing when conversion into the picture application window occurs by selecting the picture menu 410 on the screen illustrated in FIG. 8.

Referring to FIG. 9, the first layer window is again displayed as a foreground. At this time, a thumbnail 910 representing a music application which is executed as a background is displayed at the lower left part of the screen. As a result, it is possible to listen to music as a background while appreciating a picture slide show.

Figure 10:
FIG. 10 illustrates a screen appearing when a picture application on the screen illustrated in FIG. 9 is displayed on the entire screen.

FIG. 10 illustrates a screen appearing when the picture application on the screen illustrated in FIG. 9 is displayed on the entire screen.

Referring to FIG. 10, the application execution area 511 of the first layer window is displayed as the entire screen, and the music being executed as the background is displayed as a thumbnail.

The user interface method according to the present invention, as described above, can be embodied as a computer readable code on a computer readable recording medium.

According to the present invention, as described above, a user can conveniently use a multi-tasking function supported by consumer electronics (CE) products having a small-sized screen.

In detail, since applications that can be simultaneously executed are visually displayed with a multi-layer structure, it is possible to simplify program conversion and allow a user to easily manipulate a screen. Also, since an application being executed as a background is displayed as a thumbnail, a user can easily recognize the application. Also, it is possible to support a convenient multi-tasking function using a device having a four-directional key. Also, multi-tasking between a visual application and an aural application is possible, and conflict between applications in the same category.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A user interface method performed by an apparatus allowing multi-tasking, comprising:
    classifying a plurality of applications capable of being executed by the apparatus into a plurality of groups, in such a manner as to classify one or more applications that perform similar functions into the same group, wherein the applications which do not perform the similar functions are excluded from being classified into the same group; and
    displaying a window for executing a corresponding application, for each of the plurality of groups, wherein, during the classifying, the apparatus determines a function performed by each of the plurality of applications, and, based on the determination, the apparatus places the one or more applications that perform the similar functions into the same group, excludes the applications which do not perform the similar functions from the same group, and places the excluded applications in at least one different group, and the plurality of applications are classified such that the applications placed in the same group cannot be simultaneously executed with any other application from the same group, and applications of one group are capable of being simultaneously executed with applications of a different group.

2. The user interface method of claim 1, wherein the displaying of the window further comprises, displaying an application selection menu for selecting one of applications belonging to a corresponding group, in each window.

3. The user interface method of claim 2, wherein the displaying of the window further comprises, displaying a plurality of windows by using a multi-layer structure in such a manner that application execution areas of the plurality of windows overlap each other, and displaying the plurality of windows in such a manner that an application selection menu of each window is always shown, wherein the application execution areas are areas in which an execution of an application being executed is displayed.

4. The user interface method of claim 3, further comprising, displaying a thumbnail corresponding to an application being executed as a background when a plurality of applications are executed in a multi-tasking manner.

5. The user interface method of claim 3, wherein the displaying of the window further comprises, displaying an additional function selection menu for selecting one of additional functions of each application being executed, in a corresponding window.

6. The user interface method of claim 5, wherein the displaying of the application selection menu and the displaying of the additional function selection menu, comprises, locating the application selection menu and the additional function selection menu in respective edges of a screen, in such a manner that the application selection menu and the additional function selection menu do not overlap each other.

7. The user interface method of claim 6, further comprising, moving a focus to one of a plurality of items within at least one of the application selection menu and the additional function selection menu located at a predetermined edge according to a pressed direction key of a directional key input device.

8. The user interface method of claim 6, further comprising, when a currently executed application is displayed as a foreground and additional functions of the currently executed application are provided, moving a focus to one of a plurality of items of the additional function selection menu corresponding to the currently executed application.

9. The user interface method of claim 5, wherein each window of the plurality of windows includes one of the application execution areas, one application selection menu, and one additional function selection menu corresponding to one application being executed, such that the application selection menu of each window is different from each other.

10. The user interface method of claim 9, wherein the additional functions displayed in the additional function menu change according to the application being executed among the plurality of applications.

11. The user interface method of claim 9, wherein one of the plurality of applications is executed as a foreground application and another one of the plurality of application is executed as a background application, the application selection menu of a window corresponding to the foreground application is located along a first edge of a screen, the additional function selection menu of the window corresponding to the foreground application is located along a second edge of the screen, the application selection menu of a window corresponding to the background application is located along a third edge of the screen, the additional function selection menu of the window corresponding to the background application is located along a fourth edge of the screen, such that only the application execution areas of the windows corresponding to the foreground application and the background application overlap.

12. The user interface method of claim 3, further comprising, moving a focus to one of a plurality of items of an application selection menu displayed in a different window when a currently executed application is displayed as a foreground.

13. The user interface method of claim 3, wherein each window of the plurality of windows includes one of the application execution areas and one application selection menu, such that the application selection menu of each window is different from each other.

14. The user interface method of claim 1, wherein the classifying of the plurality of applications comprises classifying the plurality of applications capable of being executed by the apparatus into a visual application group and an aural application group.

15. A computer readable recording medium having embodied thereon a computer program for executing a user interface method performed by an apparatus allowing multi-tasking, the method comprising:

classifying a plurality of applications capable of being executed by the apparatus into a plurality of groups, in a manner so as to classify one or more applications that perform similar functions into the same group, wherein the applications which do not perform similar functions are excluded from being classified into the same group; and displaying a window for executing a corresponding application, for each of the plurality of groups, wherein a plurality of windows are displayed by using a multi-layer structure in such a manner that a plurality of application execution areas of the plurality of windows overlap each other and only an application execution area of a currently selected application is shown on a screen, and a menu for selecting one of applications belonging to a corresponding group is displayed in each window, during the classifying, the apparatus determines a function performed by each of the plurality of applications, and, based on the determination, the apparatus places the one or more applications that perform the similar functions into the same group, excludes the applications which do not perform the similar functions from the same group, and places the excluded applications in at least one different group, and the plurality of applications are classified such that the applications placed in the same group cannot be simultaneously executed with any other application from the same group, and applications of one group are capable of being simultaneously executed with applications of a different group.

16. The computer readable recording medium of claim 15, wherein the displaying of the window further comprises, displaying a plurality of windows by using a multi-layer structure in such a manner that application execution areas of the plurality of windows overlap each other, and displaying the plurality of windows in such a manner that an application selection menu of each window is always shown,
wherein the application execution areas are areas in which an execution of an application being executed is displayed.

17. The computer readable recording medium of claim 16, the method further comprising, displaying a thumbnail corresponding to an application being executed as a background when a plurality of applications are executed in a multi-tasking manner.

18. The computer readable recording medium of claim 16, wherein the displaying of the window further comprises, displaying an additional function selection menu for selecting one of additional functions of each application being executed, in a corresponding window.

19. The computer readable recording medium of claim 18, wherein the displaying of the application selection menu and the displaying of the additional function selection menu, comprises, locating the application selection menu and the additional function selection menu in respective edges of a screen, in such a manner that the application selection menu and the additional function selection menu do not overlap each other.

20. The computer readable recording medium of claim 19, the method further comprising, moving a focus to one of a plurality of items within at least one of the application selection menu and the additional function selection menu located at a predetermined edge according to a pressed direction key of a directional key input device.

21. The computer readable recording medium of claim 19, the method further comprising, when a currently executed application is displayed as a foreground and additional functions of the currently executed application are provided, moving a focus to one of a plurality of items of the additional function selection menu corresponding to the currently executed application.

22. The computer readable recording medium of claim 18, wherein each window of the plurality of windows includes one of the application execution areas, one application selection menu, and one additional function selection menu corresponding to one application being executed, such the application selection menu of each window is different from each other.

23. The computer readable recording medium of claim 22, wherein the additional functions displayed in the additional function menu change according to the application being executed among the plurality of applications.

24. The computer readable recording medium of claim 22, wherein one of the plurality of applications is executed as a foreground application and another one of the plurality of application is executed as a background application,
the application selection menu of a window corresponding to the foreground application is located along a first edge of a screen,
the additional function selection menu of the window corresponding to the foreground application is located along a second edge of the screen,
the application selection menu of a window corresponding to the background application is located along a third edge of the screen,
the additional function selection menu of the window corresponding to the background application is located along a fourth edge of the screen,
such that only the application execution areas of the windows corresponding to the foreground application and the background application overlap.

25. The computer readable recording medium of claim 16, the method further comprising, moving a focus to one of a plurality of items of an application selection menu displayed in a different window when a currently executed application is displayed as a foreground.

26. The computer readable recording medium of claim 16, wherein each window of the plurality of windows includes one of the application execution areas and one application selection menu, such that the application selection menu of each window is different from each other.

27. The computer readable recording medium of claim 15, wherein the classifying of the plurality of applications comprises classifying the plurality of applications capable of being executed by the apparatus into a visual application group and an aural application group.

28. A user interface method performed by an apparatus allowing multi-tasking, comprising:
classifying a plurality of applications into a first group of applications and a second group of applications, wherein the applications of the first group of applications perform similar functions and cannot be simultaneously executed with any other application from the first group, and the applications of the second group of applications perform similar functions, cannot be simultaneously executed with any other application from the second group, and are capable of being simultaneously executed with the first group of applications;
displaying a first window corresponding to the first group of applications for executing any one of the applications of the first group of applications; and
displaying a second window corresponding to the second group of applications for executing any one of the applications of the second group of applications simultaneously with any one of the application of the first group of applications.

29. The user interface method of claim 28, wherein the first window includes:
a first application execution area in which an execution of one of the applications of the first group of application is displayed;
a first application selection menu which includes a menu item for each of the applications of the first group of applications for selecting one of the applications of the first group of applications to be executed and displayed in the first application execution area; and
a first function selection menu which includes menu items corresponding to functions capable of being selected for execution during the execution of the one of the applications of the first group of applications, and
wherein the second window includes:
a second application execution area in which an execution of one of the applications of the second group of application is displayed;
a second application selection menu which includes a menu item for each of the applications of the second group of applications for selecting one of the applications of the second group of applications to be executed and displayed in the second application execution area; and a second function selection menu which includes menu items corresponding to functions capable of being selected for execution during the execution of the one of the applications of the second group of applications.

30. The user interface method of claim 29, wherein the first application selection menu is located along a first edge of a the screen, the first function selection menu is located along a second edge of a the screen, the second application selection menu is located along a third edge of a the screen, and the second function selection menu is located along a fourth edge of a the screen.

31. The user interface method of claim 30, wherein during the execution of one of the applications of the first group of applications and the execution of one of the application of the second group of applications, the first application selection menu, the first function selection menu, the second application selection menu and the second function selection menu are always displayed on the screen, and the first application execution area and the second application execution area overlap one another on the screen.

32. The user interface method of claim 28, wherein, during the classifying, the apparatus determines a function performed by each of the plurality of applications, and, based on the determination, the apparatus places one or more applications that perform similar functions into the first group, excludes the applications which do not perform similar functions of the first group from the first group, and places the excluded applications in the second group.

* * * * *